United States Patent [19]
Ohtsuka

[11] 3,865,862
[45] Feb. 11, 1975

[54] PROCESS FOR PREPARING MONOFORMYLDIAMINOMALEONITRILE

[75] Inventor: Yozo Ohtsuka, Kanagawa, Japan

[73] Assignee: Sagami Chemical Research Center, Tokyo, Japan

[22] Filed: Nov. 5, 1973

[21] Appl. No.: 413,063

[30] Foreign Application Priority Data
Nov. 7, 1972 Japan.............................. 47-110772

[52] U.S. Cl.............................. 260/465.4, 260/309
[51] Int. Cl........................................... C07c 121/02
[58] Field of Search................................. 260/465.4

[56] References Cited
OTHER PUBLICATIONS
Bredereck, et al., C.A. 51, (1957), pp. 4363–4364.

Primary Examiner—Joseph P. Brust
Attorney, Agent, or Firm—Sughrue, Rothwell, Mion, Zinn & Macpeak

[57] ABSTRACT

A process for preparing monoformyldiaminomaleonitrile which comprises heating diaminomaleonitrile and formic acid in a non-polar aprotic solvent as a reaction medium at a temperature below 100°C is disclosed.

2 Claims, No Drawings

PROCESS FOR PREPARING MONOFORMYLDIAMINOMALEONITRILE

BACKGROUND OF THE INVENTION

1. Field of the Invention

This invention relates to an improved process for preparing monoformyldiaminomaleonitrile. More particularly, this invention relates to a process for preparing monoformyldiaminomaleonitrile having the formula

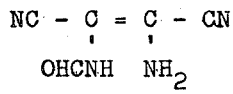

which comprises heating diaminomaleonitrile and formic acid in a non-polar aprotic reaction medium at a temperature below about 100°C.

2. Description of the Prior Art

The present inventor found that monoformyldiaminomaleonitrile is useful as a precursor for the synthesis of a wide variety of organic compounds, in particular, imidazole compounds and also per se exhibits a certain activity on various microorganisms and a growth controlling activity on plants similar to those observed in diaminomaleonitrile. Thus, monoformyldiaminomaleonitrile has a wide variety of utilities and is a useful compound in industry. In addition, monoformyldiaminomaleonitrile shows a higher water solubility at neutral or even in the acidic or basic side than diaminomaleonitrile, and forms a water-insoluble complex with a heavy metal which is capable of easily forming a salt with an acid.

It is also known that monoformyldiaminomaleonitrile can be prepared by subjecting diaminomaleonitrile and formic acid without using a reaction medium to a heat treatment at a temperature below 35°C for a period of 5 minutes as described in Bredereck et al., Ann. Chem. 600, 95 (1956). This reference also teaches that, when a reaction temperature exceeds 35°C or the reaction is continued over a longer period of time, only a black tar-like product is obtained and the desired product cannot be isolated in an appreciable amount.

However, in the conventional process as described in the above prior art reference, the yield of the product is at most 50 percent, the remainder of the product being a black tar-like material which is difficult to be purified, and the conventional process is not said to be useful for the production of monoformyldiaminomaleonitrile on an industrial scale.

SUMMARY OF THE INVENTION

An object of this invention is to provide an improved process for preparing monoformyldiaminomaleonitrile which is useful for the production of monoformyldiaminomaleonitrile on an industrial scale.

Another object of this invention is to provide an improved process for preparing monoformyldiaminomaleonitrile in high yield.

DETAILED DESCRIPTION OF THE INVENTION

As a result of extensive researches for a process for the production of monoformyldiaminomaleonitrile on an industrial scale, it is found that substantially pure monoformyldiaminomaleonitrile can be produced in high yield by reacting diaminomaleonitrile and formic acid in a specific reaction medium at specific reaction temperature.

In accordance with the process of this invention, the reaction of diaminomaleonitrile and formic acid is conducted in a non-polar aprotic medium at a temperature below about 100°C. The above non-polar aprotic medium is distinctly different in the solubility of formic acid from that of alcohols, ethers and the like which are typical polar solvent, and such polar solvents cannot be employed in the production of monoformyldiaminomaleonitrile on an industrial scale since they tend to decrese the reaction rate excessively.

Suitable examples of non-polar solvents which can be used in the process of this invention are broadly those having a solubility of formic acid less than 10 percent, preferably less than 5 percent by weight at room temperature. Typical examples of such solvents are aromatic hydrocarbons such as benzene, toluene, xylene and the like, aliphatic hydrocarbons such as petroleum ether, petroleum benzine, kerosene, cyclohexane and the like and carbon tetrachloride. These reactions media should preferably be used in a substantially anhydrous state since the presence of water in the reaction tends to produce polymeric materials.

In the process of this invention, the amount of the non-polar aprotic medium relative to the reactants is not critical but it is generally convenient from the practical standpoint that the amount of the non-polar aprotic medium is about 5 to about 10 times the amount of formic acid on the weight basis. When the amount of the medium is extremely low, a tar-like material tends to be formed.

In the reaction of this invention, formic acid is used in an amount of about 1 to about 4 moles, preferably from 1.8 to 2.6 moles per 1 mole of diaminomaleonitrile.

As described previously, the reaction of this invention is conducted at a temperature below about 100°C. At reaction temperature higher than about 110°C, the reaction tends to give 4(5)-cyanoimidazole-5(4)-carboxamide (tautomers of 4-cyanoimidazole-5-carboxamide and 5-cyanoimidazole-4-carboxamide), and at reaction temperatures below 0°C, the reaction does not proceed at a desired rate. The reaction is generally carried out at a temperature ranging from room temperature (about 25°C) to 100°C, preferably from 40 to 100°C, but it is to be noted that the reaction of this invention can be carried out at a temperature ranging from about 0° to about 100°C without adversely affecting the purity and yield of the desired product. The reaction time varies depending upon the reaction temperature and the type of the reaction medium used, e.g., a boiling point of the medium, but generally the lower the reaction temperature the longer the reaction time. In an embodiment using benzene as a reaction medium, the reaction time is usually from 5 minutes to 1 hour, preferably 15 to 30 minutes.

As is apparent to one skilled in the art, the reaction of this invention is carried out in a heterogeneous system and is generally completed within several tens of minutes to several hours under the conditions described above without causing undesirable polymerization reactions whereby the desired product can be obtained in a substantially pure state and in high yield.

Monoformyldiaminomaleonitrile obtained in accordance with the process of this invention has a melting point of 182° to 184°C as determined in a substantially pure specimen and the following characteristics: mass spectrum m/e 136 (parent), 108 ($C_4H_4N_4^+$), 81 ($C_3H_3N_3^+$), 54 ($C_2H_2N_2^+$) etc; nmr (DMSO) 7.25 (broad s, 2H, $NH_2$), 8.10 (s, 1H, CHO) and 9.40 (broad s, 1H, NH); exchangeable with $D_2O$.

The present invention is further illustrated by the following examples, but they are not to be construed as limiting the scope of this invention.

EXAMPLE 1

Into a three-necked flask equipped with a stirrer and a distillation unit was charged 10 g of diaminomaleonitrile and 200 ml of dried benzene, and 16 ml of 100 percent formic acid was then added to the flask while stirring. After the mixture was stirred for about 1 hour at room temperature, the mixture was heated to distil off about 100 ml of an azeotropic mixture (boiling point), 72°–79°C) which was found to contain about 9 ml of formic acid. The residue in the flask was allowed to cool, filtered, washed with a small amount of diethyl ether and dried to give 12 g (95 percent yield) of a pale brown solid. The infrared absorption spectrum of the product thus obtained was fully consistent with that of an authentic sample of monoformyldiaminomaleonitrile.

EXAMPLE 2

2 g of diaminomaleonitrile was suspended in 40 ml of substantially anhydrous cyclohexane, and 4 ml of formic acid was added to the suspension followed by stirring. The reaction mixture was first separated into two layers and subsequently turned into a suspension where solids are suspended in a liquid. The temperature of the suspension was then gradually increased for 15 minutes while refluxing cyclohexane. The cyclohexane layer was removed and the residue was thoroughly dried under reduced pressure to obtain 2.2 g (84 percent yield) of a brown product. The infrared absorption spectrum of the product was fully consistent with an authentic sample of monoformyldiaminomaleonitrile prepared in the conventional process.

EXAMPLE 3

2 g of diaminomaleonitrile was suspended in 40 ml of petroleum ether and 4 ml of formic acid was added to the suspension followed by stirring. The reaction mixture did not turn into a suspension where solids are suspended in a liquid, and the resulting solids where adhered to the wall of the reaction vessel. After the reaction mixture was heat-refluxed at a temperature of about 60°C for 30 minutes, the mixture was worked up in the same manner as described in Example 2 to obtain 2.2 g (94 percent yield) of monoformyldiaminomaleonitrile. The infrared absorption spectrum of the product was found to be fully consistent with an authentic sample of the same compound.

EXAMPLE 4

A mixture of 2 g of diaminomaleonitrile, 2 ml of formic acid and 40 ml of dehydrated carbon tetrachloride was heated at reflux for 6 hours. The reaction mixture was then distilled under reduced pressure to remove the solvent, and the residue was dried to obtain a pale brown solid. The infrared absorption spectrum of the product thus obtained showed that the product contained 80 percent monoformyldiaminomaleonitrile and the balance was unreacted diaminomaleonitrile. Fractional crystallization of the above product yielded pure monoformyldiaminomaleonitrile.

REFERENCE EXAMPLE

The same procedure as described in Example 2 was followed but using ethyl alcohol in place of benzene and conducting the reaction for 6 hours. In this manner, any formyl compound was not found to be formed, and substantially entire amount of diaminomaleonitrile used as a starting material was recovered from the reaction mixture.

While the invention has been described with reference to specific embodiments thereof, it will be apparent to one skilled in the art that various modifications and changes can be made therein without departing from the spirit and the scope of the present invention.

What is claimed is:

1. In a process for preparing monoformyl-diaminomaleonitrile comprising reacting diaminomaleonitrile with formic acid, the improvement which comprises heating diaminomaleonitrile and formic acid in an amount of 1 to 4 moles of formic acid per 1 mole of said nitrile in a non-polar aprotic solvent having a solubility of formic acid of less than 10 percent by weight at room temperature at a temperature of from 0° to 100°C under substantially anhydrous conditions for a period of 5 minutes to 1 hour.

2. A process according to claim 1 wherein said non-polar aprotic medium is benzene, toluene, xylene, petroleum ether, petroleum benzine, kerosene, cyclohexane or carbon tetrachloride.

* * * * *